United States Patent [19]

Nakazawa et al.

[11] Patent Number: 5,087,851
[45] Date of Patent: Feb. 11, 1992

[54] DEVICE FOR DRIVING A PART ON A VEHICLE

[75] Inventors: Toru Nakazawa; Yuji Kokumai; Koichi Naito, all of Nagaoka; Shoji Suzuki; Tadao Noguchi, both of Iwaki, all of Japan

[73] Assignee: Alps Electric Co., Ltd., Tokyo, Japan

[21] Appl. No.: 518,697

[22] Filed: May 3, 1990

[30] Foreign Application Priority Data

Jun. 21, 1989 [JP] Japan ................. 1-72569[U]
Jun. 23, 1989 [JP] Japan ................. 1-161880

[51] Int. Cl.⁵ .......................... H01L 41/08
[52] U.S. Cl. .......................... 310/323
[58] Field of Search .......................... 310/323

[56] References Cited

U.S. PATENT DOCUMENTS

| | | | |
|---|---|---|---|
| 4,633,266 | 12/1986 | Alf et al. | 343/903 |
| 4,642,509 | 2/1987 | Kumada | 310/323 |
| 4,697,117 | 9/1987 | Mishiro | 310/323 |
| 4,705,980 | 11/1987 | Mishiro | 310/323 |
| 4,728,843 | 3/1988 | Mishiro | 310/328 |
| 4,864,153 | 9/1989 | McIntosh | 307/10.1 |
| 4,912,351 | 3/1990 | Takata et al. | 310/323 |

FOREIGN PATENT DOCUMENTS 63-11070 1/1988 Japan.

Primary Examiner—Mark O. Budd
Assistant Examiner—Thomas M. Dougherty
Attorney, Agent, or Firm—Guy W. Shoup; Norman R. Klivans; B. Noel Kivlin

[57] ABSTRACT

A device capable of being operated by remote control for driving a part on a vehicle uses an ultrasonic linear actuator as a source for driving the part on a vehicle. An ultrasonic linear actuator neither produces electromagnetic noises nor is influenced by electromagnetic noises, which is useful for electronization of parts on a vehicle.

3 Claims, 4 Drawing Sheets

DEVICE FOR DRIVING A PART ON A VEHICLE

BACKGROUND OF THE INVENTION

The present invention relates to a device capable of being operated by remote control for driving a part on a vehicle.

As the part on a vehicle stated above, a door locking device, an automatic antenna device, a window opening and closing device, etc. can be cited, and as a conventional driving source for these driving devices, there are known an electromagnetic motor and an electromagnetic valve.

However, recently, there is a tendency that an ultrasonic actuator or an ultrasonic linear actuator, which is small and light, produces neither mechanical noise nor electromagnetic noises, and has further a simple structure, as a motor or a valve driving the part on a vehicle described above.

For example, as a prior art door locking device, a device is known, which is so constructed that locking or unlocking operation can be effected by operating manually a door locking knob linked with a door locking portion, and at the same time the locking or unlocking operation can be effected also by remote control by means of an actuator disposed in the door locking portion stated above. As the actuator described above, a solenoid, an electromagnetic motor and a traveling wave type ultrasonic motor (disclosed e.g. in JP-UM-A-63-34868) is used.

However, in the prior art door locking device, in the case where a solenoid is used as the actuator, working noise thereof is remarkable, which impairs silentness in the passenger room of the vehicle and in the case where an electromagnetic motor is used, not only working noise thereof is remarkable but also it requires a mechanism for transforming a rotational movement into a linear movement, which gives rise to increase in weight and produces also noises in a radio set. On the other hand, in the case where a traveling wave type ultrasonic motor is used, although it can be intended to reduce working noise and electromagnetic noises, it has drawbacks that it requires also a mechanism for transforming a rotational movement into a linear movement, which gives rise to increase in weight, and that the energy conversion efficiency is low. Further, e.g. as a prior art automatic antenna device, an antenna is known, which is so constructed that a flexible cable is inserted in a telescopic type antenna rod mounted extensively in the axial direction, one end of this cable being connected with the extremity portion of the antenna rod stated above, while the other end thereof is connected with a driving mechanism, and the antenna rod stated above is extended or contracted by moving the cable stated above in the axial direction of the antenna rod by means of the driving mechanism described above started together with a radio switch, etc. in the passenger room, linked therewith.

In such an automatic antenna device, as the driving mechanism stated above, a mechanism is known, which is so constructed that the rotation of the motor is reduced by means of a worm mechanism and transmitted to a pinion gear, the rotation of which is further transmitted to a rack formed on one side of the cable to be transformed into a linear movement, so that the cable is moved in the axial direction of the antenna member.

However the prior art automatic antenna device described previously had a drawback that since the motor is used as the actuator, the motor produces noises at the extending/contracting operation of the antenna rod and these noises are received by the radio set together with the broadcast, which worsens the reception state.

Further there was another drawback that since it is necessary to dispose a driving mechanism for transforming the rotational movement of the motor into the linear movement, the weight of the device increases and further, since the worm gear, for which the transmission efficiency is low, is used, the energy conversion efficiency is low.

In addition, there was still another drawback that at the stop of the motor, since the extending/contracting movement of the antenna rod is restricted by the self stopping effect of the worm gear in the driving mechanism, even in the case where it is necessary to extend-/contract manually the antenna rod because of damage to the motor, etc. the operation thereof is practically impossible.

SUMMARY OF THE INVENTION

The present invention has been done in view of the situations described above and the object thereof is to provide a device for driving a part on a vehicle, e.g. a door locking device, light and quiet, using an actuator having a high energy conversion efficiency, and an automatic antenna device having a high energy conversion efficiency, because it is not required to transform a rotational movement into a linear movement, by which it is possible to realize reduction in weight by omitting the driving mechanism, manual operation is possible, and no mixed reception of noises by the radio set is produced.

In order to achieve the above object, according to the present invention, an ultrasonic linear motor disclosed in Japanese patent applications Nos. 1-55572, 63-268549, 63-318254 and 63-324547, filed previously by the applicant of the present application, is applied in order to effect locking or unlocking operation of a driving portion for a part on a vehicle, e.g. a door locking portion.

That is, according to the present invention, in a door locking device having an actuator, which makes the door locking portion effect the locking or unlocking operation, an ultrasonic linear motor is used as the actuator stated above, in which a vibrating element is mounted on a vibrating body made of an elastic substance to excite it, which produces a longitudinal vibration and a bending vibration at an end portion of the vibrating body, which longitudinal and bending vibrations are combined to produce an elliptic vibration giving rise to a driving force, this driving force making the door locking portion described above effect the locking and unlocking operation. Further, in the automatic antenna device, the extension/contraction of the antenna rod is effected by moving the driving shaft thereof by means of the ultrasonic linear motor based on the patent applications described previously.

That is, according to the present invention, in an antenna device, which is so constructed that a flexible cable is inserted in a telescopic type antenna rod mounted extensively in the axial direction, one end of this cable being connected with the extremity portion of the antenna rod stated above, while the other end thereof is connected with a driving mechanism, and the antenna rod stated above is extended or contracted by moving the cable stated above in the axial direction of the antenna rod, an ultrasonic linear motor is used as the actuator stated above, in which a vibrating element is mounted on a vibrating body made of an elastic substance to excite it, which produces a longitudinal vibration and a bending vibration at an end portion of the vibrating body, which longitudinal and bending vibrations are combined to produce an elliptic vibration giving rise to a driving force, this driving force moving the driving shaft stated above in the axial direction thereof.

The door locking device described previously acts so as to effect the locking or unlocking operation of the door locking portion by the linearly directed driving force of the ultrasonic linear motor. Consequently no device for transforming the rotational movement into the linear movement is necessary and the weight of the device is reduced accordingly.

Further, since the driving source is a ultrasonic linear motor, there is no fear that noises having bad influences on the radio set and in addition working noise is extremely small.

Furthermore, since the ultrasonic linear motor is a driving source, in which a vibrating element is mounted on a vibrating body made of an elastic substance to excite it, which produces a longitudinal vibration and a bending vibration at an end portion of the vibration body, which longitudinal and bending vibrations are combined to produce an elliptic vibration giving rise to a driving force, the energy conversion efficiency is high and thus the load on the battery mounted on the vehicle is reduced.

Further, in the automatic antenna device described above, the driving member is moved in the axial direction of the antenna rod by the driving force in the linear direction of the ultrasonic linear motor. For this reason, no mechanism for transforming the rotational movement into the linear movement is necessary. In this way, not only it is possible to realize the weight reduction of the device, but also the energy conversion efficiency is improved owing to the fact that the energy loss due to these mechanisms is eliminated.

Still further, since the driving member is directly translated by the ultrasonic linear motor, the movement of the driving member is restricted by friction force acting between the ultrasonic linear motor and the driving member. In this way, the length of the antenna rod can be adjusted to a desired value by operating the antenna rod against the friction force described above.

Finally, since the driving member is moved by ultrasonic vibration of the ultrasonic linear motor, no electromagnetic noises are produced in the operation of extending or contracting the antenna rod, and thus the mixed reception thereof by the radio set together with the broadcast can be avoided.

DETAILED DESCRIPTION OF THE INVENTION

EMBODIMENT 1

Hereinbelow the first embodiment of the present invention will be explained, referring to FIGS. 1 to 3.

Figure 1:
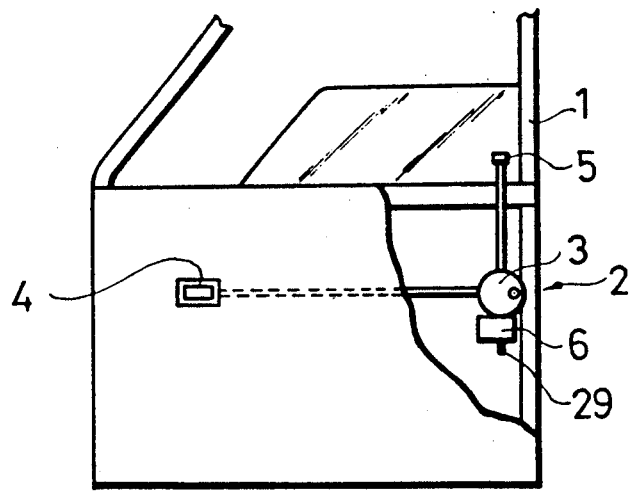
FIG. 1 is a perspective view of the principal part of a door viewed from the passenger room in a first embodiment of the present invention, the interior thereof being partially exposed.

In FIG. 1, reference numeral 1 represents a frame and a door locking device 2 is mounted on this door frame.

The door locking device 2 is composed of a door locking portion 3 including the principal part of a locking mechanism as well as an inner door handle 4 acting as a manipulating portion therefor, a door locking knob 5, an ultrasonic linear motor 6, and apart therefrom an outer door handle, a key cylinder, etc. not shown in the figure, linked thereto. This door locking device 2 is so constructed that the door locking portion 3 can be locked or unlocked by manipulating either one of the door locking knob 5, the ultrasonic linear motor 6 and the key cylinder. In particular, the ultrasonic linear motor 6 is operated by remote control e.g. from the driver's seat so that the door locking portion 3 is automatically locked or unlocked.

Hereinbelow the ultrasonic linear motor 6 will be explained, referring to FIGS. 2 and 3.

In these figures, reference numerals 15 and 16 are leg portions, which are parallel to each other, and 17 is a trunk portion connecting the base portions of these leg portions 15 and 16, all of which constitute a vibrating body 18 formed approximately in a U-shape as the whole.

Although the material and the size of the leg portions 15 and 16 and the trunk portion 17 may be appropriately selected, for the example indicated in the figures they are made of an elastic substance of aluminium, the dimensions of the trunk portion 17 are 5 mm□×26 mmL, and those of each of the leg portions 15 and 16 are 5 mm□×15 mmL. Apart therefrom, the vibrating body 18 may be made of an elastic substance of metallic material such as duralumin, iron, brass, stainless steel, etc., inorganic material such as alumina, glass, silicon carbide, etc., or organic material such as polyimide resins, nylon, etc.

Each of the mounting parts of the vibrating body 18 is chamferred so as to be inclined by 45° with respect to the leg portions 15 and 16 and the trunk portion 17 and piezoelectric elements (vibrating elements) 20 and 21 are secured to the mounting surfaces 19, respectively, by using an adhesive, etc. For these piezoelectric elements 20 and 21 a multi-layered piezoelectric actuator or a single plate piezoelectric ceramic is used and an AC voltage is applied thereto from a power source not indicated in the figure to excite it so that it produces an ultrasonic vibration in the direction perpendicular to the mounting surface 19. Similarly to the leg portions 15 and 16, etc. described previously, the dimensions of the piezoelectric elements 20 and 21 may be selected appropriately, but in the example indicated in the figure piezoelectric elements 5 mm□×9 mmL great are used.

At the place, which is opposite to the extremity of each of the leg portions 15 and 16, there are disposed 3 guiding rollers 23 along the longitudinal direction of the trunk portion 17. The guiding rollers 23 are formed so as to have a width, which is somewhat greater than that of the leg portions 15 and 16, and the rotating shaft 23a disposed on the two ends thereof is supported rotatably by the lower portion of a supporting frame 24 (linking member) enclosing the vibrating body 18.

Further a through hole 25 is formed in the upper central portion of the supporting frame 24 described above and an energizing pin 26 having a conical extremity is inserted in this through hole 25 slidably in the up and down direction. A spring 27 is disposed between a flange 26a formed in the neighborhood of the extremity of this energizing pin 26 and the supporting frame 24. The energizing pin 26 is energized always towards the trunk portion 17 by the spring 27 stated above so that the extremity thereof is engaged with a recess portion 28 formed at the center of the upper surface portion of the trunk portion 17. In this way, the leg portions 15 and 16 of the vibrating body 18 and the guiding rollers 23 are energized always in the direction, in which they approach each other.

Further reference numeral 29 represents a band-shaped moving plate inserted between the extremities of the leg portions 15 and 16 and the guiding rollers 23, which are energized so as to approach each other by the spring 27 described above. This moving plate 29 is linked with the door locking knob 5 within the door locking portion 3 at the right side end portion thereof in the figure, directly or through an intermediate member.

Figure 2:
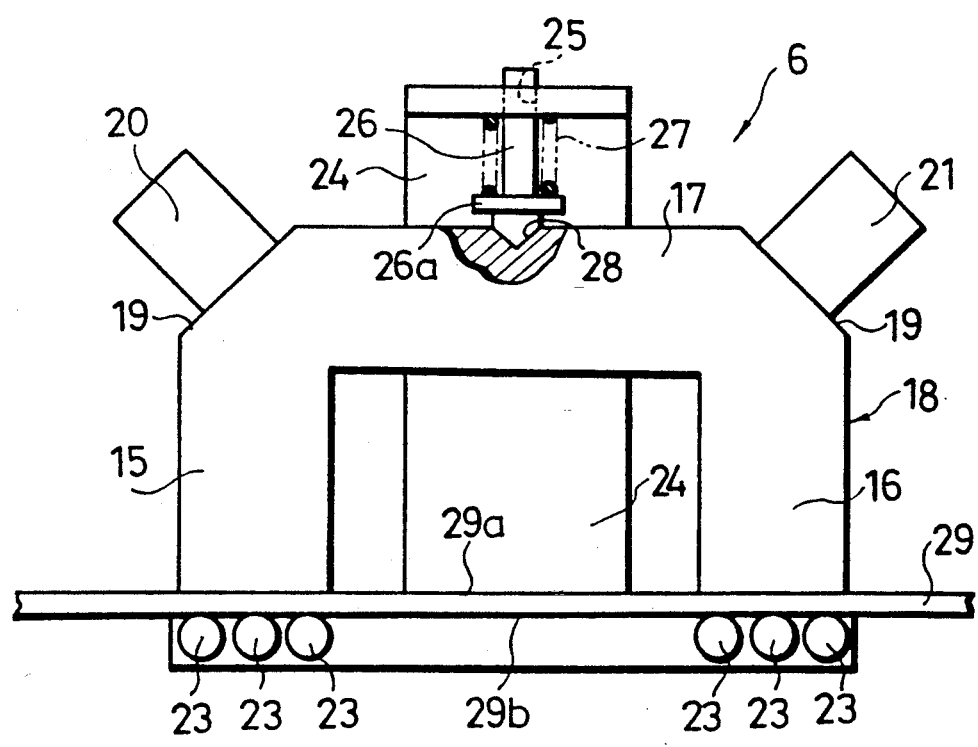
FIG. 2 is a front view of an ultrasonic linear motor in the same embodiment.
Figure 3:
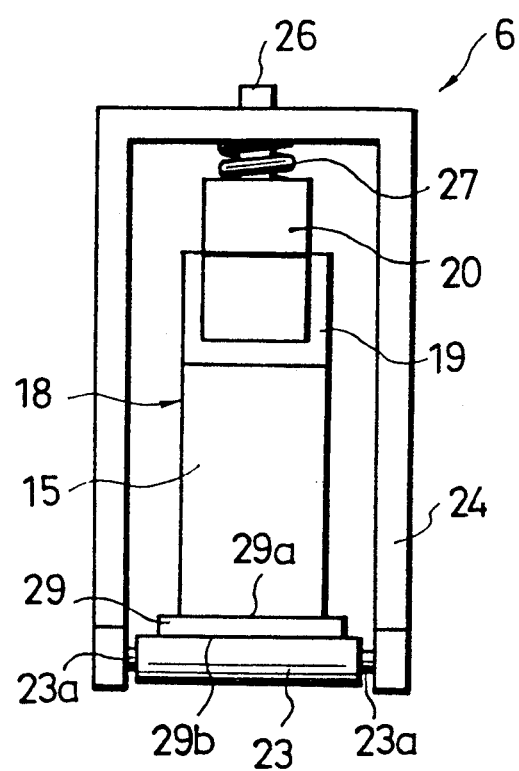
FIG. 3 is a right side view of the ultrasonic linear motor indicated in FIG. 2.

The ultrasonic linear motor 6 constructed as described above is located under the door locking portion 3 and disposed on the door frame 1 or the door locking portion 3 so that the right side end portion of the moving plate 29 in FIG. 2 is directed upward.

Further, in the door locking portion 3 described above, there is disposed a clutch mechanism not shown in the figure. In the case where the door locking knob 5 stated above is operated manually, the energizing force of the energizing pin 26 is alleviated or removed automatically by the clutch mechanism stated above. On the other hand, in the case where it is operated by the ultrasonic linear motor 6, the energizing force of the energizing pin 26 returns automatically to the initial state thereof. As the clutch mechanism as described above is used, which is so constructed that, in the case where the door locking knob 5 is operated, a linking mechanism is driven by the operational force so that the energizing pin 26 is moved so as to become more distant from the vibrating body 18 and on the other hand, in the case where the ultrasonic linear motor 6 is operated, the working state of the linking mechanism described above is removed by the moving force of the moving plate 29.

Next the action of the ultrasonic linear motor 6 and the door locking device 2 constructed as described above will be explained.

When an AC voltage in the ultrasonic frequency region is applied to either one or both of the piezoelectric elements 20 and 21 in the ultrasonic linear motor to excite the vibrating body 18, at the extremities of the leg portions 15 and 16, a longitudinal vibration and a bending vibration are combined to give rise to an elliptic vibration, which rotates in a specified direction. In this way, the moving plate 29 is moved in the direction, in which the elliptic vibration rotates. At this time, since it is possible to change the direction of the rotation of the elliptic vibration described above by varying the selection state of the piezoelectric elements 20 and 21, the phase of the AC voltage applied to the piezoelectric elements 20 and 21, it is possible to control the direction of the movement of the moving plate 29 stated above.

Further, in the door locking device 2, in the case where it is switched over from the unlocked state to the locked state by means of the ultrasonic linear motor 6 described above, the moving plate 29 is moved downward in FIG. 1 (towards the left in FIG. 2) by controlling the ultrasonic linear motor 6. Then the door locking portion 3 is in the locked state and at the same time the door locking knob 5 is moved also to the lower locking position. At this time, even if the inner handle 4 or the outer handle not shown in the figure is manipulated, the state where the door cannot be opened is realized. On the contrary, when the moving plate 29 is moved upward in FIG. 1 by controlling the ultrasonic linear motor 6, the door locking portion 3 is switched over from the locked state to the unlocked state and at the same time the door locking knob 5 is moved also upward to the unlocking position. At this time the state where the door can be opened by manipulating the inner handle 4 or the outer handle is realized.

As explained above, in the present embodiment, since it is possible to lock or unlock the door locking portion 3, the locked or unlocked state of the door at each part of the vehicle can be controlled e.g. from the driver's seat. In addition, since the moving plate 29 can be driven in the linear direction by the ultrasonic linear motor 6, no device for transforming the rotational movement into the linear movement is necessary and thus it is possible to intend to reduce the weight of the device accordingly.

Further it has advantages that there is no fear that no noises having bad influences on the radio set, etc. are produced by the ultrasonic linear motor 6 and that the working noise is extremely small, because the vibrating body 18 vibrates with a frequency in the ultrasonic region.

Furthermore, in the ultrasonic linear motor, since the piezoelectric elements 20 and 21 are mounted on the vibrating body 18 made of an elastic substance to excite it so as to produce an elliptic vibration at the end portion of the vibrating body 18 by using the piezoelectric elements 20 and 21 and the moving plate 29 is moved by this elliptic vibration, the energy conversion efficiency is extremely high and it is possible to reduce the load on the battery.

Further, although, in the present embodiment, 3 guiding rollers 23 are disposed at the extremity of each of the leg portions 15 and 16, the ultrasonic linear motor according to the present invention is not restricted thereto, but 2 or more than 3 guiding rollers may be used instead thereof.

In addition, although, in the present embodiment, particularly the vibrating body 18 is formed approximately in a U-shape with the two leg portions 15 and 16 and the trunk portion 17, the ultrasonic linear motor according to the present invention is not restricted thereto, it is a matter of course that various modifications that the number of leg portions is one or greater than 2, that the trunk portion is curved, etc. are possible. Further it is also a matter of course that the leg portions 15 and 16 may not be arranged parallel to each other.

Furthermore the size, the location, the shape, etc. of each part of the ultrasonic linear motor shown in the present embodiment are shown only as examples and they can be arbitrarily modified in the design according to the form of use.

As explained above, according to the present invention, since it is possible to obtain the driving force in the linear direction by means of the ultrasonic linear motor, no device for transforming the rotational movement into the linear movement is necessary and thus it is possible to reduce the weight of the device accordingly.

Further it has advantages that there is no fear that no noises having bad influences on the radio set, etc. are produced by the actuator and that the working noises is extremely small, because the ultrasonic linear motor is used as the actuator.

Furthermore, in the ultrasonic linear motor, since the vibrating elements are mounted on the vibrating body made of an elastic substance to excite it so as to produce a longitudinal vibration and a bending vibration at the extremity portion of the vibrating body described above by using the vibrating elements, which longitudinal and bending vibrations are combined to produce the elliptic vibration giving rise to the driving force, the energy conversion efficiency is high, which is very advantageous for reducing the load on the battery.

EMBODIMENT 2

Now the second embodiment of the present invention will be explained, referring to FIGS. 4 and 5.

Figure 4:
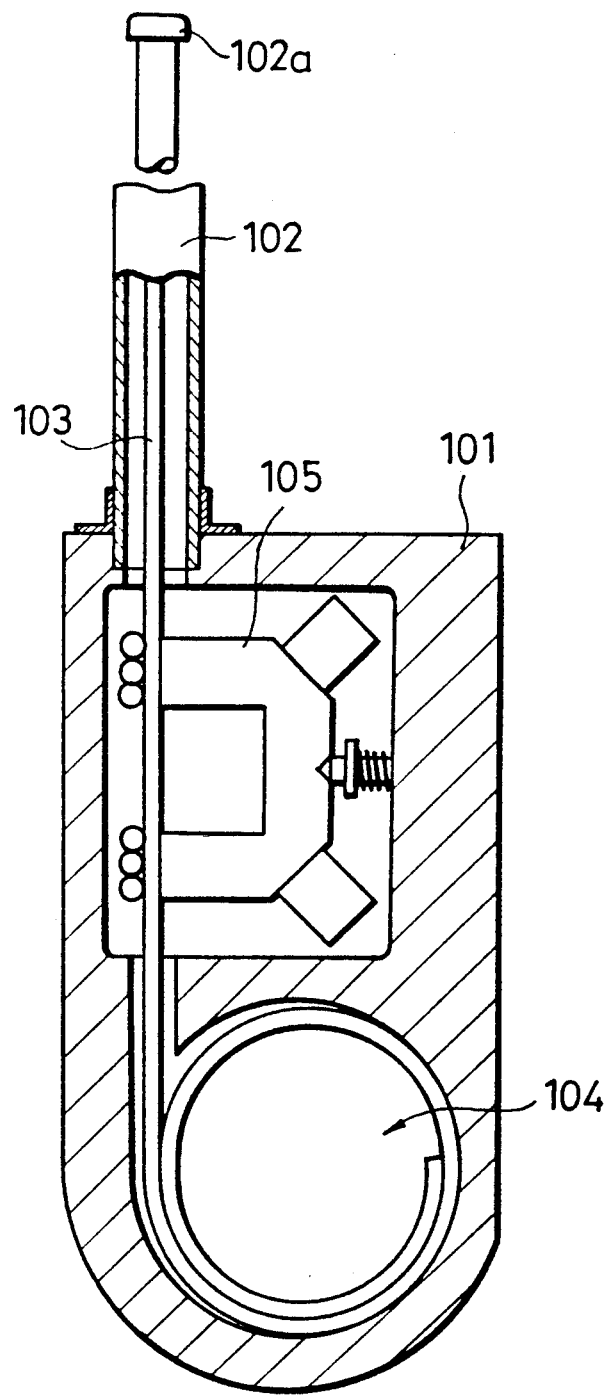
FIG. 4 is a cross-sectional view of a second embodiment of the present invention.

In FIG. 4, reference numeral 101 represents the main body of the device and a telescopic type antenna rod 102 is mounted on the upper portion of this main body 101 of the device.

This antenna rod 102 consists of a plurality of rod members having stepwise decreasing diameters, which constitute one extensible rod as the whole by engaging successively one of them coaxially and slidably with the preceding.

Further, within the antenna rod 102, there is disposed a driving cable (driving member) 103. This driving cable 103 is made of a substance having a suitable flexibility in a band shape, one end of which is connected with the extremity portion 102a of the antenna rod 102 described above. On the other hand, the other end portion of the driving cable 103 is received by a cable receiving chamber 104 formed in the lower portion of the main body 101 of the device and wound along the inner wall of the cable receiving chamber 104 stated above.

The driving cable 103 is arranged so as to be in contact with the ultrasonic linear motor 105 so that it is moved in the axial direction of the antenna rod 102 described above.

Hereinbelow the ultrasonic linear motor 105 will be explained, referring to FIG. 5.

Figure 5:
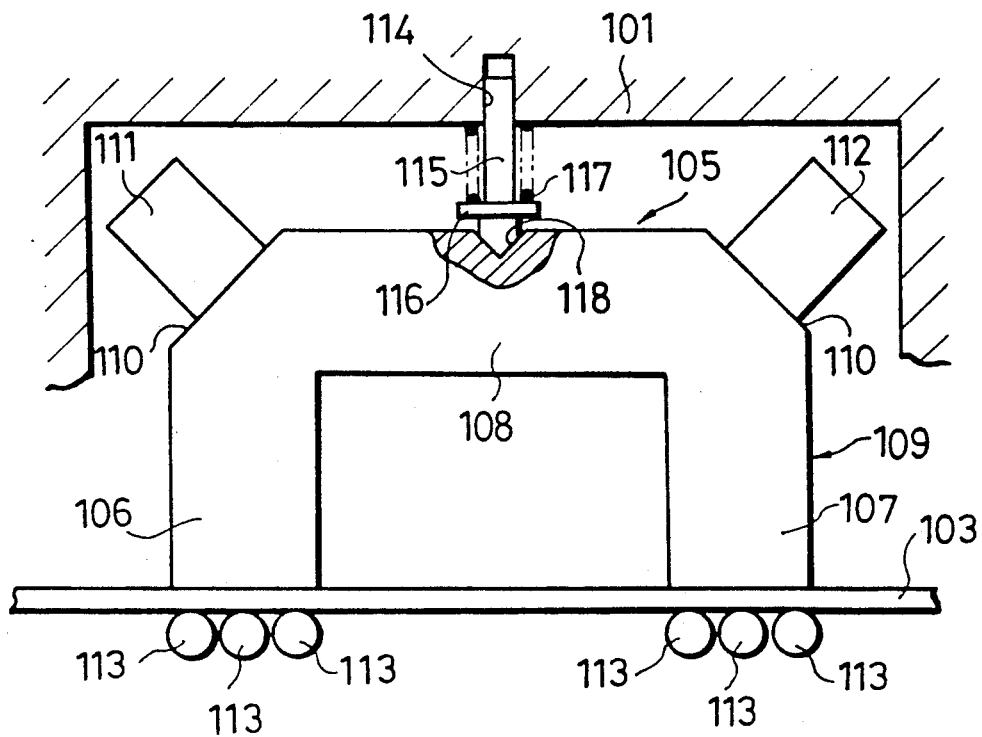
FIG. 5 is a scheme showing the whole construction of an ultrasonic linear motor.

In FIG. 5, reference numerals 106 and 107 are leg portions, which are parallel to each other; and 108 is a trunk portion connecting the base portions of these leg portions 106 and 107, all of which constitute a vibrating body 109 formed approximately in a U-shape as the whole. The detailed structure thereof is identical to that of the ultrasonic linear motor described previously in EMBODIMENT 1.

At the place, which is opposite to the extremity of each of the leg portions 106 and 107, there is disposed 3 guiding rollers 113 along the longitudinal direction of the trunk portion 108. The guiding rollers 113 are formed so as to have a width, which is somewhat greater than that of the leg portions 106 and 107, and the two extremities thereof are supported rotatably by the main body 101 of the device.

Further a hole portion 114 is formed in the upper central portion of the main body 101 of the device and an energizing pin 115 having a conical extremity is inserted in this hole portion 114 slidably in the axial direction. A spring 117 is disposed between a flange 116 formed in the neighborhood of the extremity of this energizing pin 115 and the main body 101 of the device. The energizing pin 115 is energized always towards the trunk portion 108 by the spring 117 stated above so that the extremity thereof is engaged with a recess portion 118 formed at the center of the upper surface portion of the trunk portion 108. In this way the leg portions 106 and 107 of a vibrating body 109 are energized always towards the driving cable 103 so that the driving cable 103 is supported between the leg portions 106 and 107 and the guiding rollers 113.

Now the action of the automatic antenna device constructed as described above will be explained.

When an AC voltage in the ultrasonic frequency region is applied to either one or both of the piezoelectric elements 111 and 112 in the ultrasonic linear motor 105 to excite the vibrating body 109, at the extremities of the leg portions 106 and 107, a longitudinal vibration and a bending vibration are combined to give rise to an elliptic vibration, which rotates in a specified direction. In this way the driving cable 103 is moved in either one of the axial directions of the antenna rod 102 corresponding to the direction of the rotation of the elliptic vibration so that the antenna rod 102 connected with one end of the driving cable 103 is extended or contracted in the axial direction.

At this time, since it is possible to change the direction of the rotation of the elliptic vibration described above by varying the selection state of the piezoelectric elements 111 and 112, the phase of the AC voltage applied to the piezoelectric elements 111 and 112, it is possible to control the direction of the movement of the driving cable 103 stated above. Further, in the state where the application of the voltage to the piezoelectric elements 111 and 112 in the ultrasonic linear motor 105 is stopped, the driving cable 103 is held between the leg portions 106 and 107 and the guiding rollers 113 and the extension/contraction of the antenna rod 102 is prevented by the friction force acting therebetween and the friction force between different rod members constituting the antenna rod 102.

As explained above, by the automatic antenna device described in the present embodiment, since the antenna rod 102 can be extended and contracted by controlling the ultrasonic linear motor 105, the antenna rod 102 can be arbitrarily operated by remote control, e.g. the antenna rod 102 is extended/contracted, linked with the power switch of the radio set on the vehicle, etc.

Furthermore, since the driving cable 103 can be directly linearly moved in the axial direction of the antenna rod 102, any driving mechanism for transforming the rotational movement into the linear movement is not necessary at all. For this reason it can be realized to reduce remarkably the weight of the device and at the same time the energy loss accompanied by the transmission of the driving force through the driving mechanism, which improves the energy conversion efficiency and reduces the load on the battery on the vehicle.

Further, since the automatic antenna device in the present embodiment is so constructed that the driving cable 103 is held by the friction force between the leg portions 106 and 107 of the ultrasonic linear motor 105 and the driving cable 103, the antenna rod 102 can be extended/contracted manually against the friction force stated above by selecting suitably the force of the spring 117 energizing the ultrasonic liner motor 105.

Still further, since the device is so constructed that the driving cable 103 is moved by the ultrasonic vibration of the ultrasonic linear motor 105, no electromagnetic noises are produced, and as the result the reception of the noises by the radio set together with the broadcast at the extension/contraction operation of the antenna rod 102 is removed.

Figure 6:
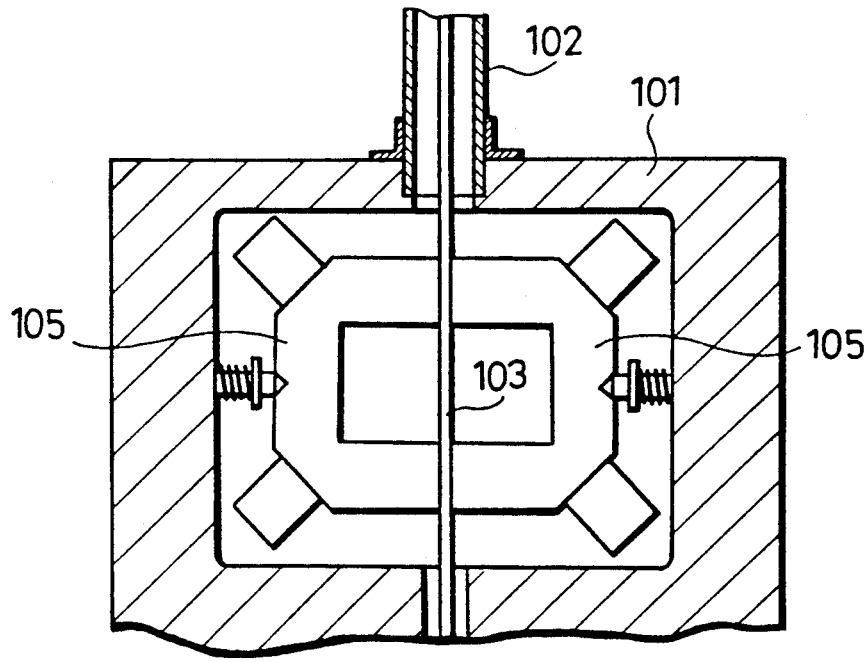
FIG. 6 is a scheme showing a modified example of the embodiments stated above.

Although, in the present embodiment, 3 guiding rollers 113 are disposed at the extremity of each of the leg portions 106 and 107, the automatic antenna device according to the present invention is not restricted thereto, but the number of guide rollers may be selected arbitrarily. That is, it may be e.g. one or greater, than 3. Further, as indicated in FIG. 6, the driving cable 103 may be held by two ultrasonic linear motors 105 instead of one ultrasonic linear motor and the guiding rollers 113.

In addition, although, in the present embodiment, particularly the vibrating body 109 is formed approximately in a U-shape with the two leg portions 106 and 107 and the trunk portion 108, it is a matter of course that various modifications that the number of leg portions is greater than 2, that the trunk portion is curved, etc. are possible. Further it is also a matter of course that the leg portions 106 and 107 may not be arranged parallel to each other.

Furthermore the size, the location, the shape, etc. of each part of the ultrasonic linear motor shown in the present embodiment are shown only as examples and they can be arbitrarily modified in the design according to the form of the automatic antenna device as a whole, etc.

Still further, it is obvious that the present invention can be applied to various driving device for parts on a vehicle, apart from the door locking portion and the automatic antenna device described in the above embodiments.

As explained above, according to the present invention, since it is possible to move the driving member directly by the ultrasonic linear motor, no device for transforming the rotational movement into the linear movement is necessary. As the result, not only it can be realized to reduce remarkably the weight of the device, but also the energy loss due to the transmission of the driving force through the driving mechanism, which improves the energy conversion efficiency and reduces the load on the battery.

Still further, since the device is so constructed that the driving member is driven directly by the ultrasonic linear motor, e.g. as the antenna rod, the length can be adjusted also manually to a desired value by operating the driving member against the friction force acting therebetween.

Still further, since the device is so constructed that the driving member is moved by the ultrasonic vibration of the ultrasonic linear motor, no electromagnetic noises are produced and the reception of the noises by the radio set together with the broadcast at the operation is removed.

What is claimed is:
1. A device for driving a component having a driving portion and including a vibrating body made of an elastic substance and vibrating elements mounted on the vibrating body, said vibrating body comprising:
 a pair of leg portions operatively contacting said driving portion; and
 a connecting portion connecting to one end of each leg portion, wherein one of said vibrating elements is mounted on a chamfered surface formed where each leg portion connects to said connecting portion and each said vibrating element produces a longitudinal vibration and a bending vibration at the chamfered surfaces of said vibrating body, the combination of longitudinal and bending vibrations producing an elliptical vibration driving force, said driving force operating said driving portion.

2. A device for driving a door locking mechanism having a door locking portion for locking and unlocking a door and including a vibration body made of an elastic substance, and vibrating elements mounted on the vibrating body, said vibrating body comprising:
 a pair of leg portions operatively contacting said door locking portion; and
 a connecting portion connecting to one end of each leg portion, wherein one of said vibrating elements is mounted on a chamfered surface formed where each leg portion connects to said connecting portion, and each said vibrating element produces a longitudinal vibration and a bending vibration at the chamfered surfaces of said vibrating body, the combination of longitudinal and bending vibrations producing an elliptical vibration driving force, said driving force operating said door locking portion.

3. A device for driving an antenna rod mechanism having an antenna driving member, one end of the antenna driving member being connected with an extremity portion of an antenna rod and including a vibrating body made of an elastic substance, and vibrating elements mounted on the vibrating body, said vibrating body comprising:
 a pair of leg portions operatively contacting said antenna driving member; and
 a connecting portion connecting to one end of each leg portion, wherein one of said vibrating elements is mounted on a chamfered surface formed where each leg portion connects to said connecting portion, and each said vibrating element produces a longitudinal vibration and a bending vibration at the chamfered surfaces of said vibrating body, the combination of longitudinal and bending vibrations producing an elliptical vibration driving force, said driving force operating said antenna driving member.

* * * * *